July 3, 1956
J. J. DIGBY
2,752,794
ENGINE STARTER GEARING
Filed Dec. 27, 1954
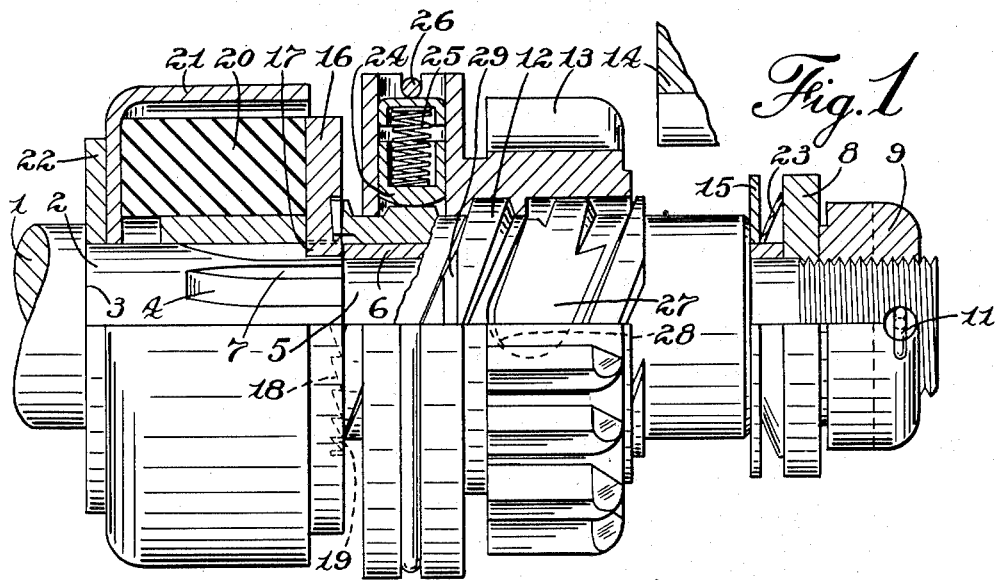
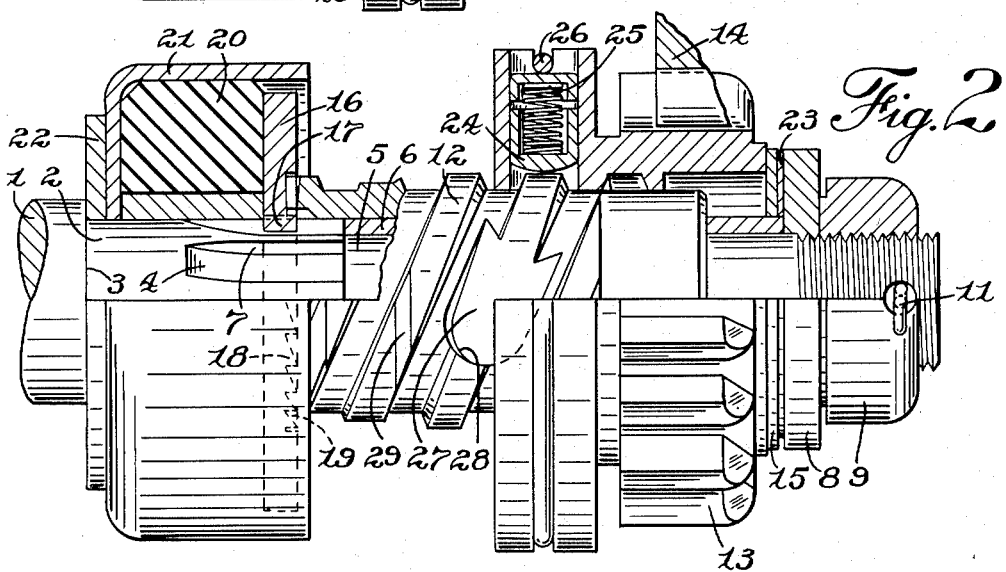
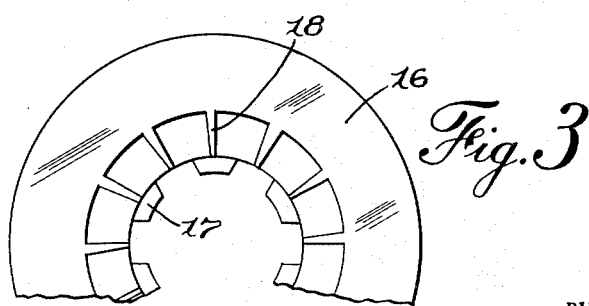
WITNESS:
Esther M. Stockton
INVENTOR.
James J. Digby
BY
Clinton L. James
ATTORNEY

United States Patent Office 2,752,794
Patented July 3, 1956

2,752,794

ENGINE STARTER GEARING

James J. Digby, Elmira, N. Y., assignor to Bendix Aviation Corporation, Elmira Heights, N. Y., a corporation of Delaware Application December 27, 1954, Serial No. 477,640

5 Claims. (Cl. 74—7)

The present invention relates to engine starter gearing and more particularly to a small light-duty unit especially adapted for starting small internal combustion engines such as outboard marine engines.

It is an object of the present invention to provide a novel engine starter gear which is efficient in operation, simple and economical in construction, and of short overall length.

It is another object to provide such a device of the automatically meshing and demeshing type which is arranged to maintain its engagement with the engine until the latter is reliably self-operative.

It is another object to provide such a device in which the overrunning action when the engine fires takes place quietly and smoothly.

Further objects and advantages will be apparent from the following description taken in connection with the accompanying drawing in which:

Figure 1 is a side elevation, partly broken away and in section of a preferred embodiment of the invention showing the parts in normal or idle position;

Fig. 2 is a similar view showing the parts in cranking position; and

Fig. 3 is a detail in side elevation of the splined overrunning clutch member.

In Fig. 1 of the drawing there is illustrated a power shaft 1 having a portion of reduced diameter 2 forming a shoulder 3. The reduced portion 2 has spline grooves 4 cut therein, and the shaft is provided with a second further reduced portion 5, the external diameter of which is substantially the same as the bottom of the spline grooves 4. A sleeve 6 is mounted on the second reduced portion 5 of the shaft in abutting relation to the ends of the splines 7 formed by the grooves 4; and an abutment plate 8 is clamped against the outer end of the sleeve 6 by means of a stop nut 9 threaded on the free end of the power shaft 1 and anchored in any suitable manner as by means of a cotter pin 11.

A hollow screw shaft 12 is slidably journalled on the sleeve 6, and a pinion 13 is threaded on the screw shaft for movement into and out of mesh with a gear 14 of the engine to be started, the meshing position of the pinion being defined by the abutment plate 8, a thrust washer 15 being preferably interposed between the pinion and abutment plate.

Means for yieldably actuating the screw shaft 12 from the power shaft 1 is provided comprising a driving clutch plate 16 having internal splines 17 (Fig. 3) slidably engaging in the spline grooves 4 of the power shaft and having overrunning clutch teeth 18 formed on the side thereof for engagement with similar clutch teeth 19 on the adjacent end of the screw shaft 12. Movement of the clutch member 16 away from the screw shaft is yieldably resisted by an elastic cushion member here shown in the form of a ring 20 of elastically deformable material such as rubber contained in a cup-shaped member 21 seated on the first reduced portion 2 of the power shaft and located thereon by the shoulder 3, preferably with the inter-position of a thrust washer 22.

The screw shaft 12 is yieldably urged into engagement with the driving clutch member 16 by a light compression spring 23 which is interposed between the abutment plate 8 and the thrust washer 15. It will be noted that the driving clutch member 16 is confined on the splines 7 of the power shaft by engagement of its internal splines 17 against the end of the sleeve 6.

Means for maintaining the pinion 13 in mesh with the engine gear 14 during the initial explosions of the engine until the engine is reliably self-operative is provided comprising a radially slidable detent 24 in said pinion which bears frictionally on the top of the threads of the screw shaft by virtue of a compression spring 25 confined by a lock ring 26; and a recess 27 in the screw shaft so located as to form a shoulder 28 which cooperates with the detent 24 to resist demeshing movement of the pinion until the detent is withdrawn by centrifugal force as the engine becomes self-operative.

The screw shaft 12 is also preferably provided with an inclined shoulder 29 positioned to be engaged by the detent 24 when the pinion is in idle position to consequently resist drifting movement of the pinion away from idle position.

In operation, starting with the parts in the positions illustrated in Fig. 1 acceleration of the power shaft 1 by the starting motor, not illustrated, causes rotation to be imparted through the splines 7, 17 to the clutch member 16, and through the overrunning clutch teeth 18, 19 to the screw shaft 12. The pinion 13 is consequently traversed to the right into mesh with the engine gear 14 until its movement is stopped by engagement of the thrust washer 15 against the abutment plate 8 as shown in Fig. 2. The screw-jack action of the screw shaft and pinion then causes the screw shaft to be forced against the driving clutch member 16, compressing the yielding member 20 to cushion the application of the torque through the pinion to the engine gear 14.

During the meshing movement of the pinion, the detent 24 enters the recess 27 in the screw shaft and thereafter resists demeshing movement of the pinion until the rotation of the pinion by the engine is sufficiently rapid to withdraw the pinion by centrifugal force, after which the parts are returned to idle position by the overrunning action of the pinion.

In case of tooth abutment between the pinion and engine gear during the meshing operation, the cushioning member 20 permits the screw shaft 12 to move backward and thereby allow time for torque to be built up to index the pinion teeth into registry with the tooth spaces of the engine gear, after which expansion of the cushioning member 20 snaps the pinion into initial mesh, which then proceeds in the normal manner.

Although but one embodiment of the invention has been shown and described in detail it will be understood that changes may be made in the design and arrangement of the parts without departing from the spirit of the invention.

I claim:

1. In an engine starter gear a power shaft, a hollow screw shaft slidably journalled thereon and formed at one end as a clutch member, a pinion threaded on the screw shaft for longitudinal movement into and out of mesh with a gear of an engine to be started, an abutment on the power shaft defining the meshing position of the pinion, a clutch member splined on the power shaft having clutching engagement with the adjacent end of the screw shaft, means yieldingly resisting longitudinal movement of the clutch member away from the screw shaft, and spring means between the screw shaft and said abutment urging the screw shaft toward the clutch member.

2. An engine starter gear as set forth in claim 1 including further a centrifugal detent mounted in the pinion engaging the screw shaft, said screw shaft having a recess receiving the detent when the pinion is in mesh with the engine gear, and resisting demesh of the pinion until the detent is withdrawn by centrifugal force.

3. An engine starter gear as set forth in claim 1 in which the power shaft has a portion of reduced diameter forming a shoulder, and said means for resisting longitudinal movement of the screw shaft comprises a yielding cushion, and means cooperating with said shoulder for preventing longitudinal movement of the cushion.

4. An engine starter gear as set forth in claim 3 in which the splines on the power shaft are formed in said reduced portion thereof and the power shaft is formed with a further smooth reduced portion extending from the splined portion; and including further a smooth hollow sleeve mounted on said further reduced portion extending from the splines to said abutment.

5. An engine starter gear as set forth in claim 4 in which said sleeve is of substantially the same external diameter as the first reduced portion of the power shaft, and serves as a bearing support for the screw shaft and as a stop to confine said clutch member on the splined portion of the shaft.

References Cited in the file of this patent

UNITED STATES PATENTS

| | | |
|---|---|---|
| 2,606,449 | Digby | Aug. 12, 1952 |
| 2,631,456 | Tobias | Mar. 17, 1953 |